(12) United States Patent
Chae et al.

(10) Patent No.: US 12,261,283 B2
(45) Date of Patent: Mar. 25, 2025

(54) ANODE PRE-LITHIATION-PRE-SODIATION METHOD, PRE-LITHIATED AND PRE-SODIATED ANODE, AND LITHIUM SECONDARY BATTERY COMPRISING SAME

(71) Applicant: LG ENERGY SOLUTION, LTD., Seoul (KR)

(72) Inventors: Oh-Byong Chae, Daejeon (KR); Ye-Ri Kim, Daejeon (KR); Seung-Hae Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 513 days.

(21) Appl. No.: 17/635,224

(22) PCT Filed: Sep. 4, 2020

(86) PCT No.: PCT/KR2020/011993
§ 371 (c)(1),
(2) Date: Feb. 14, 2022

(87) PCT Pub. No.: WO2021/045583
PCT Pub. Date: Mar. 11, 2021

(65) Prior Publication Data
US 2022/0293910 A1     Sep. 15, 2022

(30) Foreign Application Priority Data
Sep. 6, 2019  (KR) .................. 10-2019-0110945

(51) Int. Cl.
*H01M 4/139* (2010.01)
*H01M 4/02* (2006.01)
*H01M 4/04* (2006.01)

(52) U.S. Cl.
CPC ......... *H01M 4/139* (2013.01); *H01M 4/0404* (2013.01); *H01M 4/0416* (2013.01); *H01M 4/0471* (2013.01); *H01M 2004/027* (2013.01)

(58) Field of Classification Search
CPC .. H01M 4/139; H01M 4/0404; H01M 4/0416; H01M 4/0471; H01M 2004/027; H01M 4/134
See application file for complete search history.

(56) References Cited

U.S. PATENT DOCUMENTS

| | | |
|---|---|---|
| 10,270,083 B2 | 4/2019 | Jeong et al. |
| 10,333,144 B2 | 6/2019 | Lu et al. |
| 2016/0006017 A1 | 1/2016 | Momma et al. |
| 2019/0013513 A1 | 1/2019 | Liu et al. |
| 2019/0044138 A1* | 2/2019 | Zhamu et al. ...... H01M 10/054 |
| 2019/0260010 A1 | 8/2019 | Pol et al. |
| 2019/0305298 A1 | 10/2019 | Chae et al. |
| 2019/0372118 A1 | 12/2019 | Woo et al. |

FOREIGN PATENT DOCUMENTS

| | | |
|---|---|---|
| CN | 109786660 A | 5/2019 |
| CN | 109786836 A | 5/2019 |
| CN | 110062973 A | 7/2019 |
| JP | 11-144718 A | 5/1999 |
| JP | 2012-69894 A | 4/2012 |
| JP | 2016-27562 A | 2/2016 |
| JP | 2017-507472 A | 3/2017 |
| JP | 6377114 B2 | 8/2018 |
| KR | 10-2014-0070156 A | 6/2014 |
| KR | 10-2018-0094134 A | 8/2018 |
| KR | 10-2019-0017417 A | 2/2019 |
| WO | WO2019/027663 A1 | 2/2019 |

OTHER PUBLICATIONS

European Patent Office Search Report mailed Sep. 26, 2022 for European Patent Office No. 20861347.1.
International Search Report for PCT/KR2020/011993 mailed on Dec. 23, 2020.

* cited by examiner

*Primary Examiner* — Matthew T Martin
*Assistant Examiner* — Alexandra J Simmons
(74) *Attorney, Agent, or Firm* — Birch, Stewart, Kolasch & Birch, LLP

(57) ABSTRACT

A method for pre-lithiation and pre-sodiation of a negative electrode, including the steps of: preparing a negative electrode including a negative electrode current collector, and a negative electrode active material layer on at least one surface of the negative electrode current collector. Then, applying and drying a first composition containing a lithium metal powder, a polymer binder and a dispersion medium onto the negative electrode active material layer to form a lithium metal layer. Next, applying and drying a second composition containing a sodium metal powder, a polymer binder and a dispersion medium onto the lithium metal layer to form a sodium metal layer. Then, dipping the negative electrode having the lithium metal layer and the sodium metal layer in an electrolyte for pre-lithiation and pre-sodiation. A pre-lithiated and pre-sodiated negative electrode obtained by the method and a lithium secondary battery including the same are also disclosed.

9 Claims, No Drawings

ANODE PRE-LITHIATION-PRE-SODIATION METHOD, PRE-LITHIATED AND PRE-SODIATED ANODE, AND LITHIUM SECONDARY BATTERY COMPRISING SAME

TECHNICAL FIELD

The present disclosure relates to a method for pre-lithiation/pre-sodiation of a negative electrode, a pre-lithiated/pre-sodiated negative electrode, and a lithium secondary battery including the same. Particularly, the present disclosure relates to a method for pre-lithiation/pre-sodiation of a negative electrode for improving the initial efficiency of a lithium secondary battery, a pre-lithiated/pre-sodiated negative electrode, and a lithium secondary battery including the same.

The present application claims priority to Korean Patent Application No. 10-2019-0110945 filed on Sep. 6, 2019 in the Republic of Korea, the disclosures of which are incorporated herein by reference.

BACKGROUND ART

Recently, energy storage technology has been given an increasing attention. Efforts into research and development of electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage, a significantly higher energy density, a longer cycle life and a lower self-discharge rate, as compared to conventional batteries, such as Ni-MH, Ni—Cd and sulfuric acid-lead batteries using an aqueous electrolyte.

Since the conventional lithium secondary batteries use a lithium-intercalated compound, such as $LiCoO_2$ or $LiMn_2O_4$, as a positive electrode, such batteries have been manufactured by using a carbon electrode, to which lithium is not intercalated, as a negative electrode. In the case of a carbon electrode, a passivated coating film is formed on the surface thereof upon the initial charge, and the coating film interrupts insertion of an organic solvent into a gap between carbon lattice layers and inhibits decomposition of the organic solvent. In this manner, stabilization of a carbon structure and reversibility of a carbon electrode can be improved to allow use of the carbon electrode as a negative electrode for a lithium secondary battery.

However, since the formation of such a coating film is an irreversible reaction, lithium ions are consumed, resulting in a decrease in battery capacity undesirably. In addition, since the charge/discharge efficiency of the carbon electrode and positive electrode is not completely 100%, lithium ion consumption occurs, as the cycle number is increased, resulting in the problems of a decrease in electrode capacity and degradation of cycle life.

Many studies have been conducted to solve the above-mentioned problems, and it has been found that use of a pre-lithiated carbon electrode as a negative electrode can provide a high-capacity lithium secondary battery with no decrease in capacity, since the coating film formation occurring upon the initial charge is performed in advance. It has been also found that cycle life can be improved significantly, since such a pre-lithiated carbon electrode compensates for lithium ions consumed as the cycle number is increased.

Then, active studies have been conducted about pre-lithiation of a negative electrode, such as a carbon electrode. Typically, a method for lithiating a carbonaceous active material through a physicochemical process and manufacturing an electrode, and a method for electrochemically pre-lithiating a carbon electrode have been considered.

However, there is a need for a novel method substituting for the above-mentioned pre-lithiation methods, since lithium used for the pre-lithiation methods is expensive.

DISCLOSURE

Technical Problem

The present disclosure is designed to solve the problems of the related art, and therefore the present disclosure is directed to providing a method for pre-lithiation/pre-sodiation of a negative electrode for improving the initial efficiency of a lithium secondary battery.

The present disclosure is also directed to providing a negative electrode obtained by the method for pre-lithiation/pre-sodiation of a negative electrode, and a lithium secondary battery including the same.

Technical Solution

In one aspect of the present disclosure, there is provided a method for pre-lithiation/pre-sodiation of a negative electrode according to any one of the following embodiments.

According to the first embodiment of the present disclosure, there is provided a method for pre-lithiation and pre-sodiation of a negative electrode, including the steps of:
preparing a negative electrode including a negative electrode current collector, and a negative electrode active material layer on at least one surface of the negative electrode current collector;
applying and drying a first composition containing a lithium metal powder, a polymer binder and a dispersion medium onto the negative electrode active material layer to form a lithium metal layer;
applying and a second composition containing a sodium metal powder, a polymer binder and a dispersion medium onto the lithium metal layer to form a sodium metal layer; and
dipping the negative electrode having the lithium metal layer and the sodium metal layer in an electrolyte for pre-lithiation and pre-sodiation.

According to the second embodiment of the present disclosure, there is provided the method for pre-lithiation and pre-sodiation of a negative electrode as defined in the first embodiment, wherein the electrolyte for pre-lithiation and pre-sodiation includes a lithium salt, a sodium salt and a non-aqueous solvent.

According to the third embodiment of the present disclosure, there is provided the method for pre-lithiation and pre-sodiation of a negative electrode as defined in the second embodiment, wherein the lithium salt includes LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium tetraphenylborate, or a mixture of two or more of them.

According to the fourth embodiment of the present disclosure, there is provided the method for pre-lithiation and pre-sodiation of a negative electrode as defined in the third embodiment, wherein the sodium salt includes NaCl, NaBr, NaI, $NaClO_4$, $NaBF_4$, $NaB_{10}Cl_{10}$, $NaPF_6$, $NaCF_3SO_3$, $NaCF_3CO_2$, $NaAsF_6$, $NaSbF_6$, $NaAlCl_4$, $CH_3SO_3Na$, $CF_3SO_3Na$, $(CF_3SO_2)_2NNa$, sodium chloroborate, sodium lower aliphatic carboxylate, sodium tetraphenylborate, or a mixture of two or more of them.

According to the fifth embodiment of the present disclosure, there is provided the method for pre-lithiation and pre-sodiation of a negative electrode as defined in any one of the first to the fourth embodiments, wherein the lithium metal powder is loaded in an amount of 0.01 mg/cm² to 0.70 mg/cm² on the negative electrode active material layer.

According to the sixth embodiment of the present disclosure, there is provided the method for pre-lithiation and pre-sodiation of a negative electrode as defined in any one of the first to the fifth embodiments, wherein the sodium metal powder is loaded in an amount of 0.05 mg/cm² to 2.0 mg/cm² on the lithium metal layer.

According to the seventh embodiment of the present disclosure, there is provided the method for pre-lithiation and pre-sodiation of a negative electrode as defined in any one of the first to the sixth embodiments, wherein the lithium metal powder is loaded in an amount of 0.07 mg/cm² to 0.20 mg/cm² on the negative electrode active material layer.

According to the eighth embodiment of the present disclosure, there is provided the method for pre-lithiation and pre-sodiation of a negative electrode as defined in any one of the first to the seventh embodiments, wherein the sodium metal powder is loaded in an amount of 0.22 mg/cm² to 0.65 mg/cm² on the lithium metal layer.

In another aspect of the present disclosure, there is provided a negative electrode according to any one of the following embodiments.

According to the ninth embodiment of the present disclosure, there is provided a pre-lithiated and pre-sodiated negative electrode obtained by the method as defined in any one of the first to the eighth embodiments.

According to the tenth embodiment of the present disclosure, there is provided a pre-lithiated and pre-sodiated negative electrode including: a current collector; a negative electrode active material layer on at least one surface of the current collector and the negative electrode active material layer includes a negative electrode active material; and a first coating layer including Li-carbonate and Li and a second coating layer including Na-carbonate and Na, on the surface of the negative electrode active material layer.

In still another aspect of the present disclosure, there is also provided a lithium secondary battery according to the following embodiment.

According to the eleventh embodiment of the present disclosure, there is provided a lithium secondary battery including the pre-lithiated and pre-sodiated negative electrode as defined in the ninth or the tenth embodiment.

According to the twelfth embodiment of the present disclosure, there is provided a pre-lithiated and pre-sodiated negative electrode wherein the first coating layer is present on the surface of the negative electrode active material layer and the second coating layer is present on the surface of the first coating layer opposite to the negative electrode active material layer.

Advantageous Effects

The method for pre-lithiation/pre-sodiation of a negative electrode according to the present disclosure uses sodium, in addition to lithium applied to the conventional pre-lithiation method, to carry out preliminary reactions with two types of ions on the surface of the negative electrode, and thus improves the efficiency of a lithium secondary battery.

In other words, according to an embodiment of the present disclosure, sodium ions cheaper than lithium ions are used additionally to carry out pre-lithiation and pre-sodiation. Therefore, a lithium-composite coating film and a sodium-composite coating film are formed preliminarily, thereby forming a stronger solid electrolyte interphase (SEI). As a result, it is possible to improve the electrochemical performance of the negative electrode and the initial efficiency of the lithium secondary battery using the negative electrode.

BEST MODE

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a method for pre-lithiation/pre-sodiation of a negative electrode, including the steps of:

preparing a negative electrode including a negative electrode current collector, and a negative electrode active material layer formed on at least one surface of the negative electrode current collector;

applying and drying a composition containing a lithium metal powder, a polymer binder and a dispersion medium onto the negative electrode active material layer to form a lithium metal layer;

applying and drying a composition containing a sodium metal powder, a polymer binder and a dispersion medium onto the lithium metal layer to form a sodium metal layer; and dipping the negative electrode having the lithium metal layer and the sodium metal layer in an electrolyte for pre-lithiation/pre-sodiation.

Hereinafter, each step will be explained in more detail.

First, prepared is a negative electrode including a negative electrode current collector and a negative electrode active material layer formed on at least one surface thereof.

According to an embodiment of the present disclosure, the negative electrode may include, as a negative electrode active material, a carbonaceous material, silicon-based material (e.g. silicon oxide of $SiO_x$ ($0<x<2$)), Si, or the like.

The carbonaceous material may be at least one selected from the group consisting of crystalline artificial graphite, crystalline natural graphite, amorphous hard carbon, low-crystalline soft carbon, carbon black, acetylene black, Ketjen black, Super P, graphene, and fibrous carbon, and preferably may be crystalline artificial graphite and/or crystalline natural graphite.

Besides the above-mentioned materials, particular examples of the negative electrode active material include a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, an element of Group 1, Group 2 or Group 3 in the Periodic Table, or halogen; $0<x\leq1$; $1\leq y\leq3$; $1\leq z\leq8$), or the like; lithium metal; lithium alloy; silicon-based alloy; tin-based alloy; metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO2$, $Bi_2O_3$, $Bi_2O_4$, $Bi_2O_5$, or the like; a conductive polymer, such as polyacetylene; a Li—Co—Ni type material; titanium oxide; lithium titanium oxide, or the like. Particularly, the negative electrode active material may include a carbonaceous material and/or Si.

In general, the negative electrode is obtained by applying negative electrode slurry prepared by dispersing a negative electrode active material, conductive material and a binder in a dispersion medium to a negative electrode current collector, and carrying out drying. If necessary, the electrode slurry may further include a filler.

The negative electrode current collector generally has a thickness of 3-500 μm. The negative electrode current collector is not particularly limited, as long as it has conductivity, while not causing any chemical change in the corresponding battery. Particular examples of the negative electrode current collector include copper, stainless steel, aluminum, nickel, titanium, baked carbon, copper or stainless steel surface-treated with carbon, nickel, titanium, silver, etc., aluminum-cadmium alloy, or the like. In addition, similarly to the positive electrode current collector, fine surface irregularities may be formed on the surface of the negative electrode current collector to reinforce the binding force to the negative electrode active material. The negative electrode current collector may be used in various shapes, including a film, sheet, foil, net, porous body, foamed body, non-woven web, or the like.

The conductive material is added generally in an amount of 1-50 wt % based on the total weight of the mixture including the negative electrode active material. Such a conductive material is not particularly limited, as long as it has conductivity, while not causing any chemical change in the corresponding battery. Particular examples of the conductive material include: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whiskers, such as zinc oxide or potassium titanate; conductive metal oxides, such as titanium oxide; conductive materials, such as a polyphenylene derivative; or the like.

Meanwhile, a graphitic material having elasticity may be used as a conductive material, optionally in combination with the above-mentioned materials.

The binder is an ingredient which assists binding of the active material with the conductive material and binding to the current collector, and is added generally in an amount of 1-50 wt %, based on the total weight of the mixture including the negative electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber (SBR), fluoro-rubber, various copolymers, or the like.

The dispersion medium may include water, alcohols, such as ethanol, acetone, or the like.

The filler is an ingredient which inhibits swelling of the negative electrode and is used optionally. Such a filler is not particularly limited, as long as it is a fibrous material, while not causing any chemical change in the corresponding battery. Particular examples of the filler include: olefinic polymers, such as polyethylene or polypropylene; and fibrous materials, such as glass fibers or carbon fibers.

Next, a composition containing a lithium metal powder, a polymer binder and a dispersion medium is applied onto the negative electrode active material layer, followed by drying, to form a lithium metal layer.

The lithium metal powder functions as a source of lithium ions doped to the negative electrode.

According to an embodiment of the present disclosure, the lithium metal powder may have an average particle diameter of 10-100 μm, 20-80 μm, or 30-50 μm. When the particle diameter of the lithium metal powder satisfies the above-defined range, it has excellent dispersibility and allows stable pre-lithiation.

According to an embodiment of the present disclosure, the lithium metal powder may be loaded in an amount of 0.01-0.70 $mg/cm^2$, 0.05-0.40 $mg/cm^2$, or 0.07-0.20 $mg/cm^2$, on the negative electrode active material layer. When the loading amount of the lithium metal powder satisfies the above-defined range, it is possible to improve the initial efficiency and cycle characteristics of a battery. It is also possible to prevent the problem of degradation of stability caused by excessive electrodeposition of lithium.

Next, a composition containing a sodium metal powder, a polymer binder and a dispersion medium is applied onto the lithium metal layer, followed by drying, to form a sodium metal layer.

The sodium metal powder functions as a source of sodium ions doped to the negative electrode.

According to an embodiment of the present disclosure, the sodium metal powder may have an average particle diameter of 10-100 μm, 20-80 μm, or 30-50 μm. When the particle diameter of the sodium metal powder satisfies the above-defined range, it has excellent dispersibility and allows stable pre-sodiation.

According to an embodiment of the present disclosure, the sodium metal powder may be loaded in an amount of 0.05-2.0 $mg/cm^2$, 0.15-1.0 $mg/cm^2$, or 0.22-0.65 $mg/cm^2$, on the negative electrode active material layer. When the loading amount of the sodium metal powder satisfies the above-defined range, it is possible to improve the initial efficiency and cycle characteristics of a battery. It is also possible to prevent the problem of degradation of stability caused by excessive electrodeposition of sodium.

Next, the negative electrode having the lithium metal layer and the sodium metal layer is dipped in an electrolyte for pre-lithiation/pre-sodiation.

The electrolyte for pre-lithiation/pre-sodiation may include a lithium salt, a sodium salt and a non-aqueous solvent.

The lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium tetraphenylborate, or a mixture of two or more of them.

The sodium salt may include $NaCl$, $NaBr$, $NaI$, $NaClO_4$, $NaBF_4$, $NaB_{10}Cl_{10}$, $NaPF_6$, $NaCF_3SO_3$, $NaCF_3CO_2$, $NaAsF_6$, $NaSbF_6$, $NaAlCl_4$, $CH_3SO_3Na$, $CF_3SO_3Na$, $(CF_3SO_2)_2NNa$, sodium chloroborate, sodium lower aliphatic carboxylate, sodium tetraphenylborate, or a mixture of two or more of them.

The non-aqueous solvent may be any organic solvent used conventionally in the art with no particular limitation. Preferably, a high-boiling point organic solvent may be used so as to minimize consumption of the electrolyte for pre-lithiation/pre-sodiation, caused by evaporation during the pre-lithiation/pre-sodiation.

The non-aqueous solvent may include a carbonate solvent, an ester solvent, or a mixture of two or more of them. Particular examples of the non-aqueous solvent include, but are not limited to: propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone, ethyl propionate, and methyl propionate, but are not limited thereto, and such solvents may be used alone or in combination.

The electrolyte for pre-lithiation/pre-sodiation may further include an additive.

The additive may include vinylene carbonate, vinyl ethylene carbonate, fluoroethylene carbonate, salicylic acid, $LiBF_4$, lithium bis(trifluoromethanesulfonyl)imide (LITFSI), lithium bis(oxalate)borate (LiBOB), lithium difluoro(oxalate)borate (LiDFOB), or a mixture of two or more of them.

According to an embodiment of the present disclosure, the negative electrode having the lithium metal layer and sodium metal layer may be dipped in the electrolyte for pre-lithiation/pre-sodiation for 1-30 hours so that the negative electrode may be wetted with the electrolyte for pre-lithiation/pre-sodiation. When the dipping time satisfies the above-defined range, the negative electrode active material may be wetted sufficiently with the electrolyte for pre-lithiation/pre-sodiation, thereby facilitating the subsequent process, pre-lithiation and pre-sodiation. In addition, it is possible to prevent the problem caused by an excessively long dipping time, the problem including degradation of the durability of the electrode and easy detachment of the active material from the current collector during processing. When the electrolyte for pre-lithiation/pre-sodiation infiltrates homogeneously into the negative electrode through the wetting, lithium ions and sodium ions isolated from the lithium metal powder and sodium metal powder may be diffused homogeneously to the negative electrode, and thus pre-lithiation and pre-sodiation may be carried out with a homogeneous lithium ion concentration and sodium ion concentration over the whole negative electrode.

To facilitate dipping/wetting of the negative electrode having the lithium metal layer and sodium metal layer in/with the electrolyte for pre-lithiation/pre-sodiation, the reactor for carrying out wetting may be converted into a vacuum state of less than 760 mmHg. Herein, the electrolyte for pre-lithiation/pre-sodiation with which the negative electrode is wetted may have a temperature of 30-60° C.

Then, the negative electrode may be taken out of the electrolyte for pre-lithiation/pre-sodiation, washed with an organic solvent, and then dried. The organic solvent used for washing may include dimethyl carbonate, diethyl carbonate, ethyl methyl carbonate, or the like. In this manner, it is possible to dissolve the lithium salt and the sodium salt sufficiently and to wash the negative electrode, while causing no damage upon the negative electrode.

The drying may be carried out by the method generally known to those skilled in the art. For example, the negative electrode may be dried in a dry room at 20-40° C. for 10 minutes to 5 hours.

In another aspect of the present disclosure, there is provided a pre-lithiated/pre-sodiated negative electrode obtained by the above-described method for pre-lithiation/pre-sodiation.

In addition, the pre-lithiated/pre-sodiated negative electrode according to an embodiment of the present disclosure includes: a current collector; a negative electrode active material layer disposed on at least one surface of the current collector and including a negative electrode active material; and a first coating layer including Li-carbonate and Li and a second coating layer including Na-carbonate and Na, formed on the surface of the negative electrode active material layer. Herein, the first coating layer and the second coating layer may be formed on the same surface of the negative electrode active material layer, and may be present randomly at the same time.

The negative electrode is provided with a first coating layer including Li-carbonate and Li and a second coating layer including Na-carbonate and Na, formed on the surface of the negative electrode active material layer. The first coating layer and the second coating layer correspond to passivated films formed by the above-described pre-lithiation and pre-sodiation.

During the pre-lithiation and pre-sodiation of the negative electrode, the electrolyte for pre-lithiation and electrolyte for pre-sodiation are in contact with the negative electrode active material to cause oxidative-reductive decomposition of the ingredients of electrolytes at the interface, and the decomposition products may be deposited or adsorbed on the interface to form coating layers as new interfacial layers.

The first coating layer may include Li reduced and deposited after lithium ions migrate toward the negative electrode during the pre-lithiation, and Li-carbonate ($Li_2CO_3$) produced by the reductive decomposition reaction between lithium ions and a carbonate compound as an organic solvent. In addition to Li-carbonate and Li, the coating layer may further include $(CH_2OCO_2Li)_2$, $(CH_2CH_2OCO_2Li)_2$, $LiO(CH_2)_2CO_2(CH_2)_2OCO_2Li$, or the like.

The second coating layer may include Na reduced and deposited after sodium ions migrate toward the negative electrode during the pre-sodiation, and Na-carbonate ($Na_2CO_3$) produced by the reductive decomposition reaction between sodium ions and a carbonate compound as an organic solvent. In addition to Na-carbonate and Na, the coating layer may further include $(CH_2OCO_2Na)_2$, $(CH_2CH_2OCO_2Na)_2$, $NaO(CH_2)_2CO_2(CH_2)_2OCO_2Na$, or the like.

The first coating layer and the second coating layer interrupt insertion of the organic solvent into the negative electrode active material layer to inhibit decomposition of the organic solvent, thereby improving stabilization of the negative electrode active material structure and negative electrode reversibility. In other words, the reaction of forming each of the first coating layer and the second coating layer is a pre-liminary reaction of the irreversible region of the negative electrode active material. Thus, it is possible to prevent the problems of consumption of lithium ions during the subsequent battery operation and degradation of battery capacity, thereby improving cycle life.

In still another aspect of the present disclosure, there is provided a lithium secondary battery including the above-described pre-lithiated/pre-sodiated negative electrode. In other words, an electrode assembly may be formed by using a positive electrode including a positive electrode active material, a separator and the pre-lithiated/pre-sodiated negative electrode, and the electrode assembly and an electrolyte may be introduced to a battery casing to provide a lithium secondary battery.

Particular examples of the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; lithium nickel oxides represented by the chemical formula of $LiNi_{1-y}M_yO_2$ (wherein M is Co, Mn, Al, Cu, Fe, Mg, B or Ga, and y is 0.01-0.3); ternary lithium manganese composite oxides represented by the chemical formula of $LiMn_{2-y}M_yO_2$ (wherein M=Co, Ni, Fe, Cr, Zn or Ta, and y=0.01-0.1), or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; ternary lithium transition metal composite oxides, such as $Li(Ni_aCo_bMn_c)O_2$ ($0<a<1$, $0<b<1$, $0<c<1$, $a+b+c=1$); or the like.

The positive electrode active material may be dispersed in a solvent together with a binder polymer, a conductive material and other additives to form a positive electrode mixture slurry. Then, the positive electrode mixture slurry may be coated on at least one surface of a positive electrode current collector, followed by drying and pressing, to form a positive electrode.

Non-limiting examples of the positive electrode current collector include foil made of aluminum, nickel or a mixture thereof, or the like, and non-limiting examples of the negative electrode current collector include foil made of copper, gold, nickel, copper alloy or a mixture thereof, or the like.

The binder polymer, conductive material and other additives used in the positive electrode may be the same as or different from those used in the negative electrode. Reference will be made to the above description about the binder polymer and conductive material.

The separator is interposed between the positive electrode and the negative electrode, and an insulating thin film having high ion permeability and mechanical strength is used as the separator. The separator generally has a pore diameter of 0.01-10 μm and a thickness of 5-300 μm. The separator may include a porous polymer substrate, such as a porous polymer film substrate or a porous polymer non-woven web substrate, alone, or may further include a porous coating layer disposed on at least one surface of the porous polymer substrate and containing inorganic particles and a binder polymer. The porous polymer film substrate may be a porous polymer film made of polyolefin, such as polyethylene or polypropylene. In addition to polyolefin, the porous polymer film substrate may be made of polyester, such as polyethylene terephthalate, polybutylene terephthalate or polyethylene naphthalene; polyacetal; polyamide; polycarbonate; polyimide; polyetherether ketone; polyether sulfone; polyphenylene oxide; polyphenylene sulfide; or the like, alone or in combination.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, or the like.

According to an embodiment of the present disclosure, the binder polymer may be classified into a dispersant binder polymer also functioning as a dispersant, and a non-dispersant binder polymer. The dispersant binder polymer is a polymer having at least one dispersion-contributing functional group in the backbone or sidechain of the polymer, and the dispersion-contributing functional group includes an OH group, CN group, or the like. Particular examples of the dispersant binder polymer include cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, or the like. Particular examples of the non-dispersant binder polymer include the above-listed binder polymers, except the examples of the dispersant binder polymer.

For example, the weight ratio of the inorganic particles to the total weight of the binder polymer and crosslinked polymer may be 50:50-99:1, particularly 70:30-95:5. When the weight ratio of the inorganic particles to the total weight of the binder polymer and crosslinked polymer satisfies the above-defined range, it is possible to prevent the problem of a decrease in pore size and porosity of the resultant coating layer, caused by an increase in content of the binder polymer and the crosslinked polymer. It is also possible to solve the problem of degradation of peeling resistance of the resultant coating layer, caused by a decrease in content of the binder polymer and the crosslinked polymer Non-limiting examples of the inorganic particles include inorganic particles having a dielectric constant of 5 or more, particularly 10 or more, inorganic particles having lithium ion transportability, or a mixture thereof.

Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, AlO(OH), $Al_2O_3H_2O$, or a mixture thereof.

As used herein, the term 'inorganic particles having lithium ion transportability' refers to inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAl-TiP)$_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as LiI—$Li_2S$—$P_2S_5$, or a mixture thereof.

Although there is no particular limitation in the thickness of the porous coating layer, the thickness may be 1-10 μm, or 1.5-6 μm. Also, the porosity of the porous separator is not particularly limited, but it may be preferably 35-65%.

The electrolyte includes conventional electrolyte ingredients, such as an organic solvent and an electrolyte salt. The electrolyte salt that may be used is a salt having a structure of $A^+B^-$, wherein $A^+$ includes an alkali metal cation such as $Li^+$, $Na^+$, $K^+$ or a mixture thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a mixture thereof. Particularly, a lithium salt is preferred. For example, $LiClO_4$, $LiCF_3SO_3$, $LiPF_6$, $LiAsF_6$, $LiN(CF_3SO_2)_2$ or a mixture thereof may be used.

The organic solvent used for the electrolyte may include a solvent generally known to those skilled in the art, such as a cyclic carbonate solvent containing a halogen substituent or not; a linear carbonate solvent; an ester solvent, a nitrile solvent, a phosphate solvent, or a mixture thereof. Particular examples of the solvent that may be used include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), flouoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate, or a mixture thereof.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

There is no particular limitation in the appearance or casing of the lithium secondary battery according to an embodiment of the present disclosure. For example, the lithium secondary battery may have a cylindrical shape using a can, prismatic shape, pouch-like shape or a coin-like shape.

In addition, the lithium secondary battery according to an embodiment of the present disclosure may include any conventional lithium secondary batteries, such as lithium metal secondary batteries, lithium ion secondary batteries, lithium polymer secondary batteries or lithium ion polymer secondary batteries.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

<Manufacture of Negative Electrode>

First, 92 parts by weight of hard carbon as a negative electrode active material, 3 parts by weight of Denka black as a conductive material, 3.5 parts by weight of styrene butadiene rubber (SBR) as a binder and 1.5 parts by weight of carboxymethyl cellulose as a binder and thickener were added to water as a dispersion medium to prepare negative electrode slurry.

The negative electrode slurry was coated on one surface of a copper current collector having a thickness of 20 μm and dried at a temperature of 80° C. Then, the negative electrode mixture layer was pressed by using a roll press device to a porosity of 28% so that it might satisfy the target thickness. After that, the resultant structure was dried in a vacuum oven at 130° C. for 8 hours to obtain a negative electrode.

<Formation of Lithium Metal Layer>

Lithium metal powder having an average particle diameter of 50 μm and polyvinylidene fluoride (PVdF) as a binder were added to tetrahydrofuran (THF) at a weight ratio of 95:5 and dispersed therein to prepare a dispersion. The dispersion was applied homogeneously onto the negative electrode active material layer formed as described above, followed by drying, to form a lithium metal layer at a lithium loading amount of 0.20 mg/cm$^2$ (loading amount capable of charging to 15% based on Li-ion charge capacity).

<Formation of Sodium Metal Layer>

Sodium metal powder having an average particle diameter of 50 μm and PVdF as a binder were added to THF at a weight ratio of 95:5 and dispersed therein to prepare a dispersion. The dispersion was applied homogeneously onto the negative electrode active material layer having the lithium metal layer formed as described above, followed by drying, to form a sodium metal layer at a sodium loading amount of 0.22 mg/cm$^2$ (loading amount capable of charging to 5% based on Na-ion charge capacity).

<Pre-Lithiation and Pre-Sodiation Through Dipping in Electrolyte>

First, 2 wt % of fluoroethylene carbonate (FEC) was added to a solvent including ethylene carbonate (EC) and ethyl methyl carbonate (EMC) mixed at a volume ratio of 3:7, and 0.5 M LiPF$_6$ and 0.5 M NaPF$_6$ were dissolved therein to prepare an electrolyte for pre-lithiation/pre-sodiation. The negative electrode having the lithium metal layer and sodium metal layer formed as described above was allowed to stand in the electrolyte for pre-lithiation/pre-sodiation for 3 hours to carry out pre-lithiation and pre-sodiation, and then washed with dimethyl carbonate (DMC) and dried at room temperature to obtain a pre-lithiated/pre-sodiated negative electrode.

<Manufacture of Lithium Secondary Battery>

The pre-lithiated/pre-sodiated negative electrode obtained as described above was cut into a coin cell size, a separator (polyolefin porous polymer film) was interposed between the negative electrode and lithium metal foil as a counter electrode, and then an electrolyte containing 1 M LiPF$_6$ dissolved in a solvent including ethylene carbonate (EC) and ethyl methyl carbonate (EMC) mixed at a volume ratio of 3:7 was injected thereto, thereby providing a coin-type half-cell.

EXAMPLE 2

A pre-lithiated/pre-sodiated negative electrode and a coin-type half-cell including the same were obtained in the same manner as Example 1, except that the loading amount of lithium metal powder was changed into 0.13 mg/cm$^2$ (loading amount capable of charging to 10% based on Li-ion charge capacity), and the loading amount of sodium metal powder was changed into 0.43 mg/cm$^2$ (loading amount capable of charging to 10% based on Na-ion charge capacity).

EXAMPLE 3

A pre-lithiated/pre-sodiated negative electrode and a coin-type half-cell including the same were obtained in the same manner as Example 1, except that the loading amount of lithium metal powder was changed into 0.07 mg/cm$^2$ (loading amount capable of charging to 5% based on Li-ion charge capacity), and the loading amount of sodium metal powder was changed into 0.65 mg/cm$^2$ (loading amount capable of charging to 15% based on Na-ion charge capacity).

COMPARATIVE EXAMPLE 1

A negative electrode and a coin-type half-cell including the same were obtained in the same manner as Example 1, except that lithium metal powder and sodium metal powder were not applied to the negative electrode.

COMPARATIVE EXAMPLE 2

A pre-sodiated negative electrode and a coin-type half-cell including the same were obtained in the same manner as Example 1, except that lithium metal powder was not applied to the negative electrode, and the loading amount of sodium metal powder was changed into 0.86 mg/cm$^2$ (loading amount capable of charging to 20% based on Na-ion charge capacity).

<Initial Reversibility Test>

Each of the coin-type half-cells according to Examples 1-3 and Comparative Examples 1 and 2 was tested in terms of charge/discharge reversibility by using an electrochemical charger. During charging, electric current was applied at a current density of 0.1 C-rate to a voltage of 0.005 V (vs. Li/Li$^+$). During discharging, each half-cell was discharged at the same current density to a voltage of 1.5 V. Herein, the first cycle efficiency was determined as a ratio of discharge capacity/charge capacity. The results are shown in the following Table 1.

TABLE 1

|  | Ex. 1 | Ex. 2 | Ex. 3 | Comp. Ex. 1 | Comp. Ex. 2 |
|---|---|---|---|---|---|
| First cycle efficiency (%) | 95.3 | 93.2 | 92.7 | 80.4 | 84.4 |

Referring to Table 1, in the case of Examples 1-3, pre-lithiation and pre-sodiation are carried out by using lithium metal powder and sodium metal powder, and thus it is possible to provide an improved initial efficiency. On the contrary, when pre-lithiation and pre-sodiation are not carried out in the case of Comparative Example 1, the lithium secondary battery shows a low initial efficiency. In addition, when only the pre-sodiation is carried by using sodium metal powder in the case of Comparative Example 2, the lithium secondary battery shows a lower initial efficiency as compared to each of the lithium secondary batteries subjected to both pre-lithiation and pre-sodiation by using lithium metal powder and sodium metal powder according to Examples 1-3.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for pre-lithiation and pre-sodiation of a negative electrode, comprising:
preparing a negative electrode comprising a negative electrode current collector, and a negative electrode active material layer on at least one surface of the negative electrode current collector;
applying and drying a first composition comprising a lithium metal powder, a polymer binder and a dispersion medium onto the negative electrode active material layer to form a lithium metal layer;
applying and drying a second composition comprising a sodium metal powder, a polymer binder and a dispersion medium onto the lithium metal layer to form a sodium metal layer; and
dipping the negative electrode having the lithium metal layer and the sodium metal layer in an electrolyte for pre-lithiation and pre-sodiation.

2. The method for pre-lithiation and pre-sodiation of the negative electrode according to claim 1, wherein the electrolyte for pre-lithiation and pre-sodiation comprises a lithium salt, a sodium salt and a non-aqueous solvent.

3. The method for pre-lithiation and pre-sodiation of the negative electrode according to claim 2, wherein the lithium salt comprises at least one of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lithium lower aliphatic carboxylate, or lithium tetraphenylborate.

4. The method for pre-lithiation and pre-sodiation of the negative electrode according to claim 2, wherein the sodium salt comprises at least one of NaCl, NaBr, NaI, NaClO$_4$, NaBF$_4$, NaB$_{10}$Cl$_{10}$, NaPF$_6$, NaCF$_3$SO$_3$, NaCF$_3$CO$_2$, NaAsF$_6$, NaSbF$_6$, NaAlCl$_4$, CH$_3$SO$_3$Na, CF$_3$SO$_3$Na, (CF$_3$SO$_2$)$_2$NNa, sodium chloroborate, sodium lower aliphatic carboxylate, or sodium tetraphenylborate.

5. The method for pre-lithiation and pre-sodiation of the negative electrode according to claim 1, wherein the lithium metal powder is loaded in an amount of 0.01 mg/cm$^2$ to 0.70 mg/cm$^2$ on the negative electrode active material layer.

6. The method for pre-lithiation and pre-sodiation of the negative electrode according to claim 1, wherein the sodium metal powder is loaded in an amount of 0.05 mg/cm$^2$ to 2.0 mg/cm$^2$ on the lithium metal layer.

7. The method for pre-lithiation and pre-sodiation of the negative electrode according to claim 1, wherein the lithium metal powder is loaded in an amount of 0.07 mg/cm$^2$ to 0.20 mg/cm$^2$ on the negative electrode active material layer.

8. The method for pre-lithiation and pre-sodiation of the negative electrode according to claim 1, wherein sodium metal powder is loaded in an amount of 0.22 mg/cm$^2$ to 0.65 mg/cm$^2$ on the lithium metal layer.

9. A pre-lithiated and pre-sodiated negative electrode obtained by the method as defined in claim 1.

* * * * *